United States Patent
Lee et al.

(10) Patent No.: US 10,906,269 B2
(45) Date of Patent: Feb. 2, 2021

(54) FIBROUS COMPONENT FOR VEHICLE EXTERIOR AND METHOD FOR MANUFACTURING THE SAME

(71) Applicants: HYUNDAI MOTOR COMPANY, Seoul (KR); KIA MOTORS CORPORATION, Seoul (KR)

(72) Inventors: Dong Uk Lee, Seoul (KR); Su Nam Lee, Gunpo-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 176 days.

(21) Appl. No.: 15/636,290

(22) Filed: Jun. 28, 2017

(65) Prior Publication Data
US 2017/0297299 A1   Oct. 19, 2017

Related U.S. Application Data

(62) Division of application No. 14/958,608, filed on Dec. 3, 2015, now abandoned.

(30) Foreign Application Priority Data

May 6, 2015 (KR) .......................... 10-2015-0062940

(51) Int. Cl.
   *B32B 5/24* (2006.01)
   *B29C 69/00* (2006.01)
   (Continued)

(52) U.S. Cl.
   CPC .............. *B32B 5/245* (2013.01); *B29C 44/12* (2013.01); *B29C 69/001* (2013.01); *B32B 3/04* (2013.01);
   (Continued)

(58) Field of Classification Search
   CPC ....... B60R 13/08–0892; B29C 44/1228–1233; B29C 44/12; B29C 69/001; B32B 5/245;
   (Continued)

(56) References Cited

U.S. PATENT DOCUMENTS 2,109,593 A * 3/1938 Macht ....................... C08L 1/12
                                                        106/18.18
5,068,001 A    11/1991 Haussling
(Continued)

FOREIGN PATENT DOCUMENTS

CN       1830659 A      9/2006
CN     100442034 C     12/2008
(Continued)

OTHER PUBLICATIONS

U.S. Office Action dated Mar. 29, 2017 issued in U.S. Appl. No. 14/958,608.
(Continued)

*Primary Examiner* — Philip C Tucker
*Assistant Examiner* — Vicki Wu
(74) *Attorney, Agent, or Firm* — Morgan, Lewis & Bockius LLP (57) ABSTRACT

A fibrous component for a vehicle exterior includes a skin layer having a multilayer structure comprising a laminated web including a reinforcing fiber and a binder fiber, the skin layer including pores that absorb sound; a sound absorbing pad layer disposed on an inner side of the skin layer and absorbing sound; and an adhesive layer disposed between the skin layer and the sound absorbing pad layer. The adhesive layer adheres the skin layer and the sound absorbing layer to each other.

15 Claims, 6 Drawing Sheets

(51) Int. Cl.
  *B32B 5/08* (2006.01)
  *B32B 5/18* (2006.01)
  *B32B 7/12* (2006.01)
  *B32B 27/32* (2006.01)
  *B29C 44/12* (2006.01)
  *B32B 37/12* (2006.01)
  *B32B 27/40* (2006.01)
  *B60R 13/08* (2006.01)
  *B32B 27/06* (2006.01)
  *B32B 37/14* (2006.01)
  *B32B 37/18* (2006.01)
  *B32B 5/10* (2006.01)
  *B32B 3/04* (2006.01)
  *B32B 37/04* (2006.01)
  *B29K 75/00* (2006.01)
  *B29L 31/30* (2006.01)

(52) U.S. Cl.
  CPC .............. *B32B 5/08* (2013.01); *B32B 5/10* (2013.01); *B32B 5/18* (2013.01); *B32B 7/12* (2013.01); *B32B 27/065* (2013.01); *B32B 27/32* (2013.01); *B32B 27/40* (2013.01); *B32B 37/12* (2013.01); *B32B 37/14* (2013.01); *B32B 37/18* (2013.01); *B60R 13/08* (2013.01); *B29K 2075/00* (2013.01); *B29K 2905/00* (2013.01); *B29K 2995/0002* (2013.01); *B29L 2031/30* (2013.01); *B32B 37/04* (2013.01); *B32B 2255/02* (2013.01); *B32B 2255/26* (2013.01); *B32B 2262/0253* (2013.01); *B32B 2262/0261* (2013.01); *B32B 2262/0284* (2013.01); *B32B 2262/14* (2013.01); *B32B 2266/0278* (2013.01); *B32B 2305/20* (2013.01); *B32B 2307/102* (2013.01); *B32B 2307/72* (2013.01); *B32B 2307/732* (2013.01); *B32B 2309/02* (2013.01); *B32B 2309/04* (2013.01); *B32B 2309/12* (2013.01); *B32B 2315/085* (2013.01); *B32B 2367/00* (2013.01); *B32B 2471/00* (2013.01); *B32B 2605/00* (2013.01); *B60Y 2306/09* (2013.01)

(58) Field of Classification Search
  CPC .......... B32B 37/14; B32B 27/40; B32B 5/08; B32B 5/18; B32B 7/12; B32B 27/065; B32B 27/32; B32B 37/18; B32B 5/10; B32B 3/04; B32B 37/12; B32B 2307/102; B32B 2605/00; B32B 37/04; B32B 2315/085; B32B 2305/20; B32B 2367/00; B32B 2309/04; B32B 2307/72; B32B 2309/12; B32B 2309/02; B32B 2262/0261; B32B 2255/02; B32B 2262/0253; B32B 2266/0278; B32B 2471/00; B32B 2307/732; B32B 2255/26; B32B 2262/0284; B29K 2075/00; B29K 2905/00; B29K 2995/0002; B29L 2031/30; B60Y 2306/09
  USPC .......................................................... 156/242
  See application file for complete search history.

(56) References Cited

U.S. PATENT DOCUMENTS

| | | | | |
|---|---|---|---|---|
| 5,652,415 | A | * | 7/1997 | Pelzer .................. B32B 3/12 181/286 |
| 5,817,408 | A | * | 10/1998 | Orimo .................. B32B 27/12 428/218 |
| 6,102,465 | A | | 8/2000 | Nemoto et al. |
| 8,167,335 | B2 | | 5/2012 | Takeuchi |
| 8,278,228 | B2 | | 10/2012 | Kaneda |
| 2003/0062738 | A1 | | 4/2003 | Fujii et al. |
| 2004/0053003 | A1 | * | 3/2004 | Coates .................. D04H 1/46 428/98 |
| 2004/0055813 | A1 | | 3/2004 | Tsuiki et al. |
| 2005/0217932 | A1 | | 10/2005 | Woodman et al. |
| 2006/0113146 | A1 | | 6/2006 | Khan et al. |
| 2006/0289230 | A1 | | 12/2006 | Connelly et al. |
| 2007/0137926 | A1 | | 6/2007 | Albin et al. |
| 2010/0066121 | A1 | | 3/2010 | Gross |
| 2011/0100748 | A1 | | 5/2011 | Nonogi et al. |
| 2011/0305865 | A1 | * | 12/2011 | Cocconi ............... B29C 44/0461 428/97 |
| 2014/0246268 | A1 | | 9/2014 | Fushiki |

FOREIGN PATENT DOCUMENTS

| | | |
|---|---|---|
| CN | 103415416 A | 11/2013 |
| CN | 104175622 A | 12/2014 |
| JP | 08-040154 A | 2/1996 |
| JP | 2003-112661 A | 4/2003 |
| JP | 2004-359066 A | 6/2006 |
| JP | 10-2007-261359 A | 10/2007 |
| KR | 10-2004-0111301 A | 12/2004 |
| KR | 2007-0120504 A | 12/2007 |
| KR | 10-2009-0092437 A | 9/2009 |
| KR | 10-1114805 B1 | 3/2012 |
| KR | 10-2013-0046078 A | 5/2013 |
| KR | 10-2014-0042982 A | 4/2014 |
| KR | 10-1391915 B1 | 5/2014 |
| KR | 10-1425852 B1 | 8/2014 |
| WO | 2005/019783 A1 | 3/2005 |
| WO | 2014/141418 A1 | 9/2014 |

OTHER PUBLICATIONS

U.S. Office Action dated Nov. 8, 2016 issued in U.S. Appl. No. 14/958,608.

F. Y. Gongchenxue, "Nonwoven Materials and Engineering," Guo Bingchen China Textile Press, No. 49, Jul. 2010 (with English Abstract).

* cited by examiner

FIBROUS COMPONENT FOR VEHICLE EXTERIOR AND METHOD FOR MANUFACTURING THE SAME

CROSS-REFERENCE TO RELATED APPLICATION

This application is a divisional patent application of U.S. patent application Ser. No. 14/958,608, filed Dec. 3, 2015 which claims the benefit under 35 U.S.C. § 119(a) of priority to Korean Patent Application No. 10-2015-0062940, filed on May 6, 2015, the disclosures of which are incorporated herein in their entirety by reference.

TECHNICAL FIELD

The present disclosure relates to a fibrous component for a vehicle exterior including a skin layer, an adhesive layer and a sound absorbing pad layer, and a method for manufacturing the same. The present inventive concept includes a skin layer having a multilayer structure in which a web formed with a reinforcing fiber having a diameter of 30 to 60 μm is laminated, and therefore, has excellent durability. In addition, the present inventive concept has excellent sound absorbing efficiency since noises are absorbed twice in the pores of the skin layer and the sound absorbing pad layer. Furthermore, the present inventive concept is formed with light materials such as fibers and polyurethane (PU) foam, and therefore, may greatly contribute to weight reduction of vehicles.

BACKGROUND

An oil pan cover, an engine under cover, and a floor cover are components for a vehicle exterior installed on a lower part of a vehicle, and are used to absorb noise generated while driving and prevent gravel, water, and other contaminants from damaging or staining the vehicle.

In existing technologies, steel has been used for components for a vehicle exterior. However, with the present desire for weight reduction in vehicles, light materials such as glass fiber-reinforced plastic reinforced with glass fiber, or glass fiber composite boards have been recently used.

Glass fiber-reinforced plastic, however, uses an injection or extrusion method when manufacturing a component due to the nature of plastic materials, and uses a rib to reinforce rigidity of curvy parts. Therefore, it has a limit in weight reduction, and is weak in absorbing engine exhaust noise and pavement noise generated while driving.

According to the prior art, a component for a vehicle exterior may be manufactured using fibers. By using fibers, a lighter component is made and fuel efficiency is enhanced. However, in the prior art, the component is manufactured by simply laminating layers made by mixing fibers, leading to unfavorable sound absorbing efficiency, and insufficient durability for use in vehicles.

In another approach, a board-type sound absorbing material is combined with glass fiber to produce an engine under cover. However, there are problems with this approach, including a limit in sound absorbing efficiency and insufficient durability. Also, the working environment of a mass production line is problematic due to the presence of arsenic acid during the molding process. A plastic injection molded material needs to be additionally added in a trimming line for a tightening part even after being processed to a component in order to avoid using arsenic acid.

Accordingly, development of a light fibrous component for a vehicle exterior having excellent durability and being capable of protecting vehicles from gravel, water, contaminants and the like, and having excellent sound absorbing efficiency has been urgently desired.

The above information disclosed in this Background section is only for enhancement of understanding of the background of the disclosure and therefore it may contain information that does not form the prior art that is already known in this country to a person of ordinary skill in the art.

SUMMARY

The present disclosure has been made in an effort to solve the above-described problems associated with the prior art, and an aspect of the present disclosure may provide a light fibrous component for a vehicle exterior having favorable durability, and having excellent sound absorbing efficiency.

Another aspect of the present disclosure may provide a method for manufacturing the fibrous component for a vehicle exterior.

Aspects of the present disclosure are not limited to the aspects described above. Other aspects of the present disclosure will become clearer with the descriptions below, and will be accomplished using means described in the claims and combinations thereof.

In one exemplary embodiment in the present disclosure, the present inventive concept provides a fibrous component for a vehicle exterior comprises a skin layer having a multilayer structure comprising a laminated web including a reinforcing fiber and a binder fiber, the skin layer including pores that absorb sound; a sound absorbing pad layer disposed on an inner side of the skin layer and absorbing sound; and an adhesive layer disposed between the skin layer and the sound absorbing pad layer, the adhesive layer adhering the skin layer and the sound absorbing layer to each other.

The reinforcing fiber may have a diameter of 30 to 60 μm, and the skin layer may be 30 to 70% by weight reinforcing fiber and 30 to 70% by weight binder fiber, based on a total weight of the skin layer.

The sound absorbing pad layer may include porous polyurethane (PU) foam, and a film surrounding the PU foam.

The film may be a polyurethane film or polyethylene film, and may have a thickness of 20 to 50 μm.

The sound absorbing pad layer may include a sound absorbing fiber forming pores that absorb sound, and an adhesive fiber binding the sound absorbing fiber.

The sound absorbing fiber may have a diameter of 10 to 30 μm, and the sound absorbing pad layer may be 60 to 80% by weight sound absorbing fiber and 20 to 40% by weight adhesive fiber, based on a total weight of the sound absorbing pad layer.

The adhesive layer may be a hot-melt adhesive or a synthetic rubber adhesive.

An oil pan cover may include the fibrous component for a vehicle exterior.

An engine under cover may include the fibrous component for a vehicle exterior.

A floor under cover may include the fibrous component for a vehicle exterior.

In another exemplary embodiment in the present disclosure, the present inventive concept provides a method for manufacturing a fibrous component for a vehicle exterior comprises steps of: preparing a skin layer having a multilayer structure comprising a laminated web including a reinforcing fiber and a binder fiber, the skin layer including pores that absorb sound; preparing a sound absorbing pad layer located on an inner side of the skin layer and absorbing sound; and adhering the skin layer and the sound absorbing pad layer, wherein the step of preparing the skin layer includes forming a web by mixing the reinforcing fiber and the binder fiber, laminating the web in a multilayer structure, and then binding the result, the reinforcing fiber has a diameter of 30 to 60 μm, and the skin layer is 30 to 70% by weight reinforcing fiber and 30 to 70% by weight binder fiber, based on a total weight of the skin layer.

The step of preparing the skin layer may further include, after the preparing of the web, preheating the web by pressing the web for 40 to 100 seconds at 150 to 230° C. with a pressure of 60 to 200 kgf/cm².

The step of preparing the skin layer may further include, after the preheating of the web, molding the web by pressing the web for 30 to 70 seconds at a temperature of greater than 0° C. and less than or equal to 40° C. with a pressure of 60 to 200 kgf/cm² to make the web into a shape of the component.

The step of preparing the skin layer may further include, after the molding of the web, trimming the web using a method of trimming metallic mold cutting, water jet cutting, or laser cutting.

The step of preparing the sound absorbing pad layer may include installing a film having a thickness of 20 to 50 μm into upper and lower parts of a metallic mold in which temperature is adjusted from 40 to 80° C.

The step of preparing the sound absorbing pad layer may further include, after the preparing of the film, injecting a crude polyurethane (PU) solution into the metallic mold, and the crude PU solution includes polyol in 50 to 80% by weight, Isocyanate in 15 to 45% by weight and a catalyst in 1 to 10% by weight, based on a total weight of the crude PU solution.

The step of preparing the sound absorbing pad layer may further include, after the injecting of the crude PU solution, foaming the crude polyurethane solution for 1 to 3 minutes after closing the metallic mold to prepare PU foam surrounded by the film.

The step of preparing the sound absorbing pad layer may further include, after the foaming, trimming the polyurethane foam using a method of trimming metallic mold cutting, water jet cutting, or laser cutting.

The step of preparing the sound absorbing pad layer may include forming a web by mixing a sound absorbing fiber having a diameter of 10 to 30 μm at 60 to 80% by weight and an adhesive fiber at 20 to 40% by weight, based on a total weight of the sound absorbing pad layer, then laminating the web and binding the result.

The step of preparing the sound absorbing pad layer may further include, after the preparing of the fiber pad, preheating the fiber pad for 40 to 100 seconds at 150 to 230° C.

The step of preparing the sound absorbing pad layer may further include, after the preheating of the fiber pad, molding the fiber pad by pressing the fiber pad for 30 to 70 seconds at a temperature of greater than 0° C. and less than or equal to 40° C. with a pressure of 60 to 200 kgf/cm² to make the fiber pad into a shape of the component.

The step of preparing the sound absorbing pad layer may further include trimming the fiber pad using a method of trimming metallic mold cutting, water jet cutting or laser cutting.

Other aspects and embodiments of the inventive concept are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

BRIEF DESCRIPTION OF THE DRAWINGS

The above and other features of the present inventive concept will now be described in detail with reference to certain exemplary embodiments thereof illustrated in the accompanying drawings which are given hereinbelow by way of illustration only, and thus are not limitative of the present inventive concept, and wherein.

It should be understood that the appended drawings are not necessarily to scale, presenting a somewhat simplified representation of various preferred features illustrative of the basic principles of the inventive concept. The specific design features of the present inventive concept as disclosed herein, including, for example, specific dimensions, orientations, locations, and shapes will be determined in part by the particular intended application and use environment.

In the figures, reference numbers refer to the same or equivalent parts of the present inventive concept throughout the several figures of the drawing.

DETAILED DESCRIPTION

Hereinafter reference will now be made in detail to various embodiments of the present inventive concept, examples of which are illustrated in the accompanying drawings and described below. While the inventive concept will be described in conjunction with exemplary embodiments, it will be understood that present description is not intended to limit the inventive concept to those exemplary embodiments. On the contrary, the inventive concept is intended to cover not only the exemplary embodiments, but also various alternatives, modifications, equivalents and other embodiments, which may be included within the spirit and scope of the inventive concept as defined by the appended claims.

Descriptions on known constitutions and functions are not shown when it is decided that they may evade the gist of the present inventive concept. In the present specification, "include" means capable of further including other constitutions when there are no particular descriptions.

Figure 1:
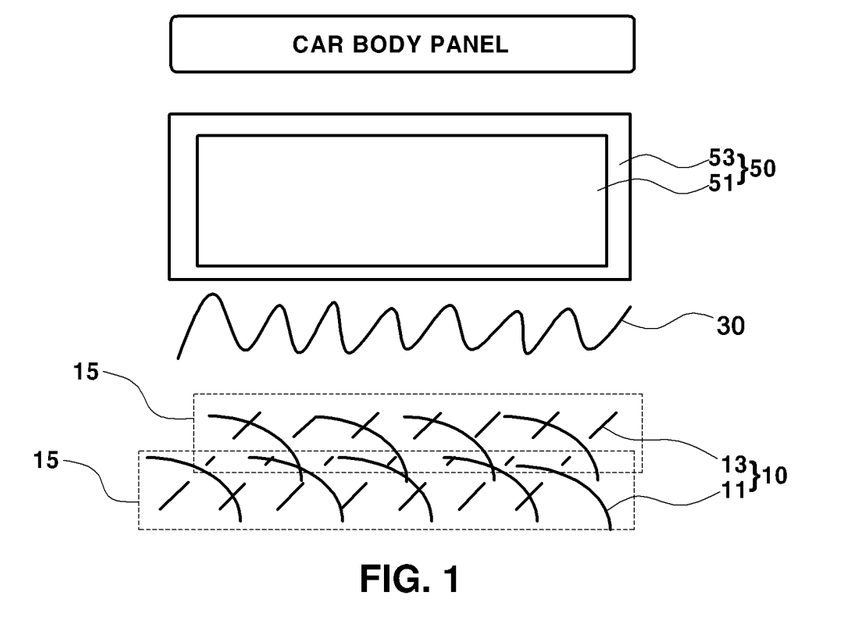
FIG. 1 is a diagram showing a fibrous component for a vehicle exterior according to one embodiment in the present disclosure.
Figure 2:
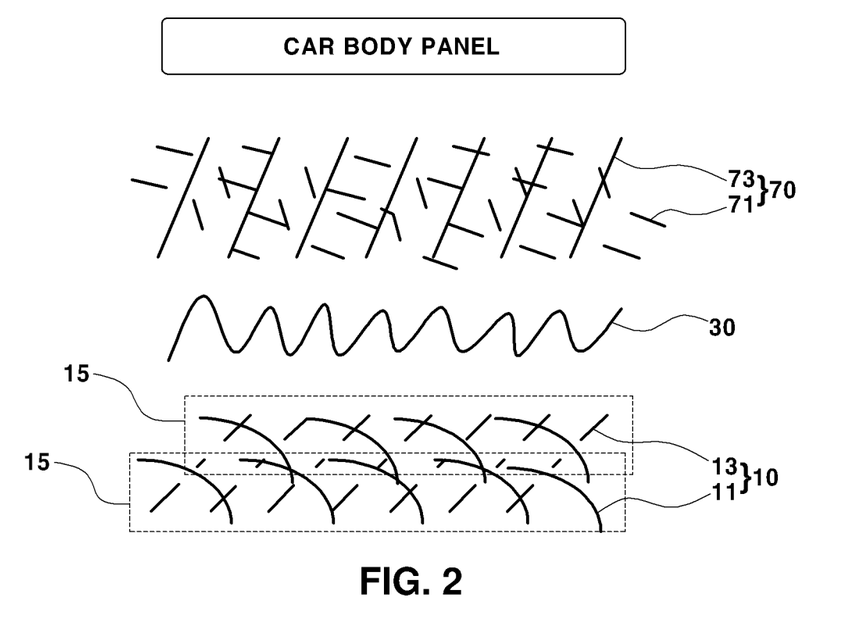
FIG. 2 is a diagram showing a fibrous component for a vehicle exterior according to another embodiment in the present disclosure.

Referring to FIG. 1 and FIG. 2, a fibrous component for a vehicle exterior (hereinafter, referred to as 'component') according to the present inventive concept includes a skin layer 10 formed with a reinforcing fiber 11 and a binder fiber 13, a sound absorbing pad layer 50, 70 located on an inner side of the skin layer 10 and absorbing noises, and an adhesive layer 30 binding the skin layer 10 and the sound absorbing pad layer 50, 70.

The skin layer 10 is a component protecting a vehicle from gravel, water and contaminants. In addition, the skin layer 10 includes pores formed on a web 15, and therefore it is capable of absorbing noise.

The skin layer 10 has a multilayer structure laminating a web 15 in which the reinforcing fiber 11 and the binder fiber 13 are mixed.

The reinforcing fiber 11 protects a vehicle by strengthening durability of the component. In addition, the web 15 is formed by the reinforcing fibers 11 being entangled, therefore, pores absorbing noise are made between the reinforcing fibers 11.

The reinforcing fiber 11 may be one or more fibers selected from the group consisting of polyethylene terephthalate (PET), polytrimethylene terephthalate (PTT), polyamide and polyphenylene sulfide (PPS).

The reinforcing fiber 11 may have a diameter of 30 to 60 μm to make pores favorably while sufficiently enhancing durability of the component, and as a result, high sound absorbing efficiency may be exhibited. When the diameter is less than 30 μm, a vehicle cannot be protected since durability is not favorable, and when greater than 60 μm, noises cannot be absorbed since pores are not formed.

The binder fiber 13 binds with the reinforcing fiber 11 so that the web 15 maintains its shape.

The binder fiber 13 may have adhesive strength at a temperature of 180° C. or lower since the component is installed on a vehicle. Accordingly, the binder fiber may be one or more fibers selected from the group consisting of low melting temperature polyethylene terephthalate (low melting temperature PET), polypropylene and polyethylene.

The binder fiber 13 may be included in the skin layer 10 in 30 to 70% by weight in order for the skin layer 10 to maintain durability and sound absorbing efficiency. When the content is less than 30% by weight, durability may be reduced since binding with the reinforcing fiber 11 is not achieved, and when greater than 70% by weight, the skin layer 10 may not absorb noises since pores are blocked.

The skin layer 10 may have a multilayer structure formed by the lamination of the web 15. Accordingly, durability is excellent compared to that of a thin single layer structure.

In addition, the skin layer 10 has excellent sound absorbing efficiency compared to a single layer structure having the same thickness. The web 15 is formed by the reinforcing fiber 11 being entangled, and when prepared to be thick, pores are not properly formed. In addition, when a thin web is prepared and stacked in multilayers, pores formed on the web 15 of each layer are arranged alternately, and sound absorbing efficiency may be further enhanced.

The adhesive layer 30 is a component binding the skin layer 10 and the sound absorbing pad layer, and may use a hot-melt adhesive or synthetic rubber adhesive.

The sound absorbing pad layer is a component absorbing noises generated in a vehicle while driving. One example may be a polyurethane (PU) layer 50, and another example may be a fiber pad layer 70.

The PU layer 50 may include porous PU foam 51 and a film 53 surrounding the PU foam.

The PU foam 51 is prepared by foaming a crude polyurethane solution thereby to be porous, and may have an open cell structure thereby to be capable of absorbing noises.

The film 53 surrounds the PU foam 51 and blocks the foam from the outside. Accordingly, the PU foam 51 may be prevented from being hydrolyzed by moisture.

The film 53 may be a polyurethane film or polyethylene film.

The film 53 may have a thickness of 20 to 50 μm so as not to decrease sound absorbing efficiency of the PU foam 51 while protecting the PU foam 51. When the thickness is less than 20 μm, the film 53 may be torn when foaming a crude polyurethane solution, and when greater than 50 μm, the film 53 functions as a sound insulating layer and may decrease sound absorbing efficiency of the PU foam 51.

Referring to FIG. 2, the fiber pad layer 70 may include a sound absorbing fiber 71 forming a web including pores, and an adhesive fiber 73 binding the sound absorbing fiber 71.

The sound absorbing fiber 71 is entangled to form pores, and the pores absorb noises.

The sound absorbing fiber 71 may be one or more fibers selected from the group consisting of polyethylene terephthalate (PET), polytrimethylene terephthalate (PTT), polyamide and polyphenylene sulfide (PPS).

The sound absorbing fiber 71 may have a diameter of 10 to 30 μm to have favorable workability and make the pores favorably, and as a result, high sound absorbing efficiency may be exhibited. When the diameter is less than 10 μm, workability declines since dust is produced in quantities when preparing the fiber pad layer 70, and when greater than 30 μm, pores are not properly formed and sound absorbing efficiency decreases.

The adhesive fiber 73 binds with the sound absorbing fiber 71 so that the fiber pad layer 70 maintains its shape.

The adhesive fiber 73 may be one or more fibers selected from the group consisting of low melting temperature polyethylene terephthalate (low melting temperature PET), polypropylene and polyethylene.

The adhesive fiber 73 may be included in the fiber pad layer in 20 to 40% by weight in order to strongly bind the sound absorbing fiber 71, and may maintain sound absorbing efficiency of the fiber pad layer 70. When the content is less than 20% by weight, binding strength for the sound absorbing fibers 71 is insufficient and the shape of the fiber pad layer 70 may not be maintained, and a quality may decline since dust is produced in quantities. When the content is greater than 40% by weight, pores are blocked and the fiber pad layer 70 may not absorb noises.

The fiber pad layer 70 may have a multilayer structure in which a web formed by mixing the sound absorbing fiber 71 and the adhesive fiber 73 is laminated. Accordingly, sound absorbing efficiency may be enhanced by the pores being arranged alternately.

The component may be an oil pan cover, an engine under cover or a floor under cover.

The component according to the present inventive concept has excellent durability by including the skin layer 10 having a multilayer structure in which a web formed with the reinforcing fiber 11 having a diameter of 30 to 60 μm is laminated. Accordingly, a vehicle may be protected from gravel, water, contaminants and the like.

In addition, the component according to the present inventive concept has excellent sound absorbing efficiency since noises are absorbed twice in the pores of the skin layer 10 and the sound absorbing pad layer 50, 70. Accordingly, quietness of a vehicle is enhanced.

In addition, the component according to the present inventive concept is formed with light materials such as fibers and PU foam, therefore, may greatly contribute to the weight reduction of a vehicle.

Figure 3:
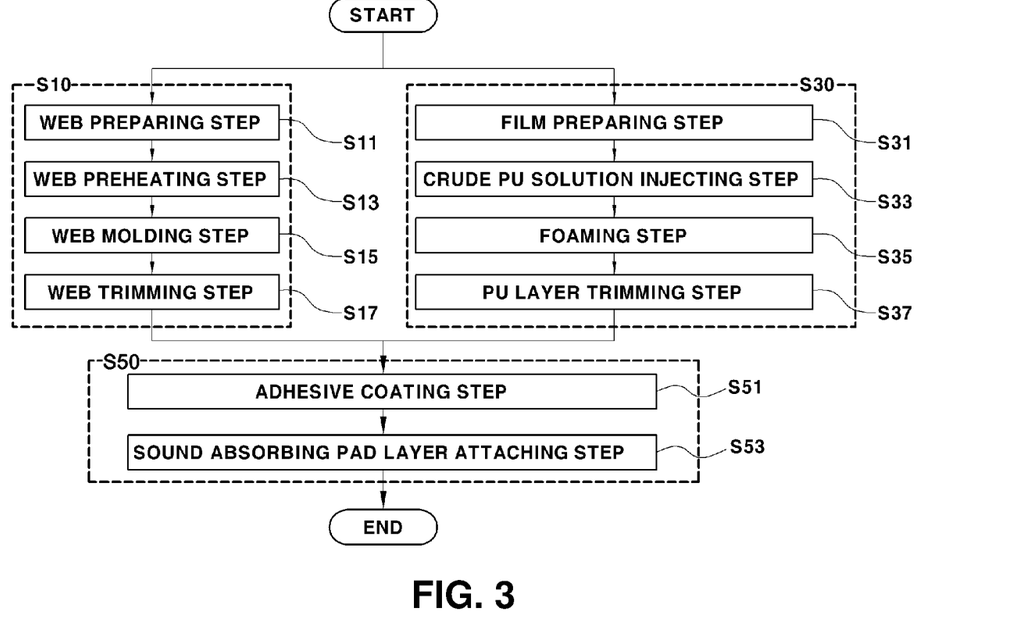
FIG. 3 is a diagram showing a method for manufacturing a fibrous component for a vehicle exterior according to one embodiment in the present disclosure.

Referring to FIG. 3, a method for manufacturing the component according to the present inventive concept includes a skin layer preparing step S10, a sound absorbing pad layer preparing step S30, and an adhering step S50. In the skin layer preparing step S10, a skin layer is prepared having a multilayer structure in which a web mixing a reinforcing fiber and a binder fiber is laminated. In the sound absorbing pad layer preparing step S30, a sound absorbing pad layer located on an inner side of the skin layer and absorbing noises is prepared. In the adhering step S50, the skin layer and the sound absorbing pad layer are adhered together.

The skin layer preparing step S10 may include a web preparing step S11, a web preheating step S13, a web molding step S15, and a web trimming step S17.

The web preparing step S11 is a step of forming a web by mixing a reinforcing fiber having a diameter of 30 to 60 μm in 30 to 70% by weight and a binder fiber in 30 to 70% by weight, laminating the web in a multilayer structure, and then binding the result.

The web may be prepared by mixing the reinforcing fiber and the binder fiber using a card layer method. In addition, in the multilayer structure, the web is laminated, and a needle punching method is used to bind the result. However, the method is not limited thereto, and any method may be used as long as a multilayer structured web is capable of being formed.

The web preheating step S13 is a step of inserting the web into a flat metallic mold tightened to a hot press, and then pressing the web for 40 to 100 seconds at 150 to 230° C. with a pressure of 60 to 200 kgf/cm². The web is preheated to make the web in a state that facilitates molding.

The web molding step S15 is a step of inserting the preheated web into a molded metallic mold tightened to a cold press, and pressing the web for 30 to 70 seconds at a temperature of 40° C. or lower with a pressure of 60 to 200 kgf/cm² to form the web into a shape of the component.

The web trimming step S17 is a step of trimming the molded web using a method of trimming metallic mold cutting, water jet cutting, or laser cutting to remove scrabs and the like.

When referring to FIG. 3, one example of the sound absorbing pad layer preparing step S30 is a step of preparing the PU layer described above, and may include a film preparing step S31, a crude PU solution injecting step S33, a foaming step S35 and a PU layer trimming step S37.

The film preparing step S31 is a step of installing a film having a thickness of 20 to 50 μm on an upper and a lower surface of a polyurethane foamed metallic mold of which temperature is adjusted from 40 to 80° C. The film may use a polyurethane film or polyethylene film.

The crude PU solution injecting step S33 is a step of discharging a crude polyurethane solution between the films attached to the upper and the lower surface of the metallic mold. The crude polyurethane solution may include polyol in 50 to 80% by weight, isocyanate in 15 to 45% by weight and a catalyst in 1 to 10% by weight.

The foaming step S35 is a step of foaming the crude polyurethane solution for 1 to 3 minutes after closing the upper and the lower surface of the polyurethane foamed metallic mold so that they touch each other. As a result, a PU layer including porous PU foam and a film surrounding the PU foam is formed.

Foaming of the crude polyurethane solution occurs in a metallic mold. Therefore, the PU layer may be prepared into a shape of the component without going through a separate molding step after the foaming step.

The PU layer trimming step S37 is a step of trimming the PU layer using a method of trimming metallic mold cutting, water jet cutting, or laser cutting to remove scrabs.

Figure 4:
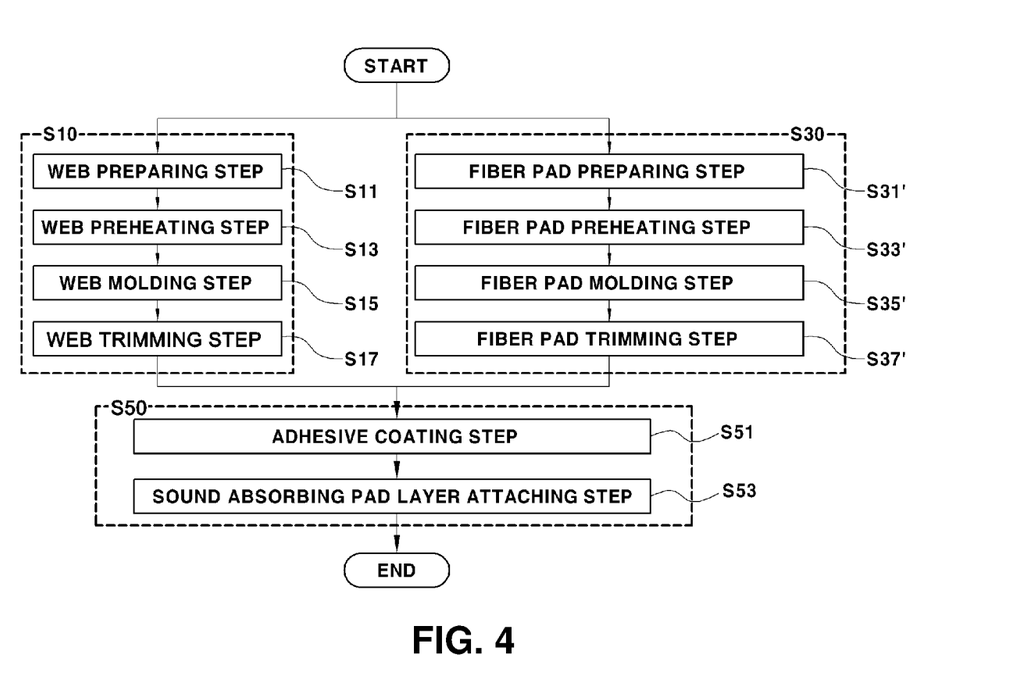
FIG. 4 is a diagram showing a method for manufacturing a fibrous component for a vehicle exterior according to another embodiment in the present disclosure.

When referring to FIG. 4, another example of the sound absorbing pad layer preparing step S30 is a step of preparing the fiber pad layer described above, and may include a fiber pad preparing step S31', a fiber pad preheating step S33', a fiber pad molding step S35', and a fiber pad trimming step S37'.

The fiber pad preparing step S31' is a step of preparing a fiber pad by forming a web through mixing a sound absorbing fiber having a diameter of 10 to 30 μm in 60 to 80% by weight and an adhesive fiber in 20 to 40% by weight, laminating the web in a multilayer structure and then binding the result.

The web may be prepared by mixing the sound absorbing fiber and the adhesive fiber using a card layer method or air layer method. The fiber pad may be prepared by laminating the web to be overlapped or randomlapped, and binding the result using a thermal bonding method using hot air.

The fiber pad preheating step S33' is a step of preheating the fiber pad for 40 to 100 seconds using an oven set at 150 to 230° C.

The fiber pad molding step S35' is a step of inserting the fiber pad into a molded metallic mold tightened to a cold press, and pressing the fiber pad for 30 to 70 seconds at a temperature of 40° C. or lower with a pressure of 60 to 200 kgf/cm² to form the fiber pad into a shape of the component.

The fiber pad trimming step S37' is a step of trimming the fiber pad using a method of trimming metallic mold cutting, water jet cutting, or laser cutting to remove scrabs.

The adhering step S50 may include an adhesive coating step S51, which is coating an adhesive coating a hot-melt adhesive or synthetic rubber adhesive on an inner side of the skin layer, and a sound absorbing pad layer attaching step S53, which is binding the skin layer and the sound absorbing pad layer through adjoining the adhesive-coated surface and one surface of the sound absorbing pad layer.

EXAMPLES

Hereinafter, the present inventive concept will be described in more detail with reference to examples. However, these examples are for illustrative purposes only, and the scope of the present inventive concept is not limited thereto.

<Test Example 1>—Measurements on Durability and Sound Absorbing Efficiency of Component Including Fiber Pad Layer (1) Example 1

(S10) A web was formed by mixing a polyethylene terephthalate fiber (reinforcing fiber) having a diameter of 39 µm in 50% by weight and a low melting temperature polyethylene terephthalate fiber (binder fiber) in 50% by weight using a card layer method. A skin layer having a surface density of 1400 g/m² was prepared after laminating the web and binding the result using a needle punching method.

The skin layer was inserted into a flat metallic mold of 200° C. and preheated for 60 seconds with 100 kgf/cm². The preheated skin layer was inserted into an oil pan cover-molded metallic mold, and then molded to an oil pan cover shape by pressing the skin layer for 50 seconds with a pressure of 80 kgf/cm². The surface temperature of the oil pan cover-molded metallic mold was adjusted to be 30° C. or lower.

(S30) A web was formed by mixing a polyethylene terephthalate fiber (sound absorbing fiber) having a diameter of 25 µm in 70% by weight and a low melting temperature polyethylene terephthalate fiber (adhesive fiber) in 30% by weight using a card layer method. A fiber pad having a surface density of 400 g/m² was prepared after laminating the web and binding the result using a thermal bonding method.

The fiber pad was preheated in an oven at 180° C. The preheated fiber pad was inserted into an oil pan cover-molded metallic mold, and then molded to an oil pan cover shape by pressing the fiber pad for 40 seconds with a pressure of 80 kgf/cm². The surface temperature of the oil pan cover-molded metallic mold was adjusted to be 30° C. or lower.

(S50) Chloroprene rubber was coated on an inner side of the skin layer. The fiber pad was attached on the adhesive-coated surface to complete an oil pan cover.

(2) Comparative Example 1

An oil pan cover prepared using a commercially available fibrous material for a vehicle exterior was used.

(3) Evaluation on Durability

The oil pan cover of Example 1 and Comparative Example 1 was installed on a vehicle. A cross country durability test was carried out for evaluating durability of the oil pan cover.

Comparative Example 1 had problems such that the oil pan cover was pushed and lint occurred even before reaching 2,000 km. Meanwhile, in Example 1, the original shape was almost preserved even after the durability test of 45,000 km.

Accordingly, it was seen that Example 1, an oil pan cover according to the present inventive concept, had far more superior durability compared to Comparative Example 1.

(4) Evaluation on Sound Absorbing Efficiency

The degree of quietness improvement of a vehicle when the oil pan cover of Example 1 was installed on a passenger diesel vehicle was evaluated.

Figure 5:
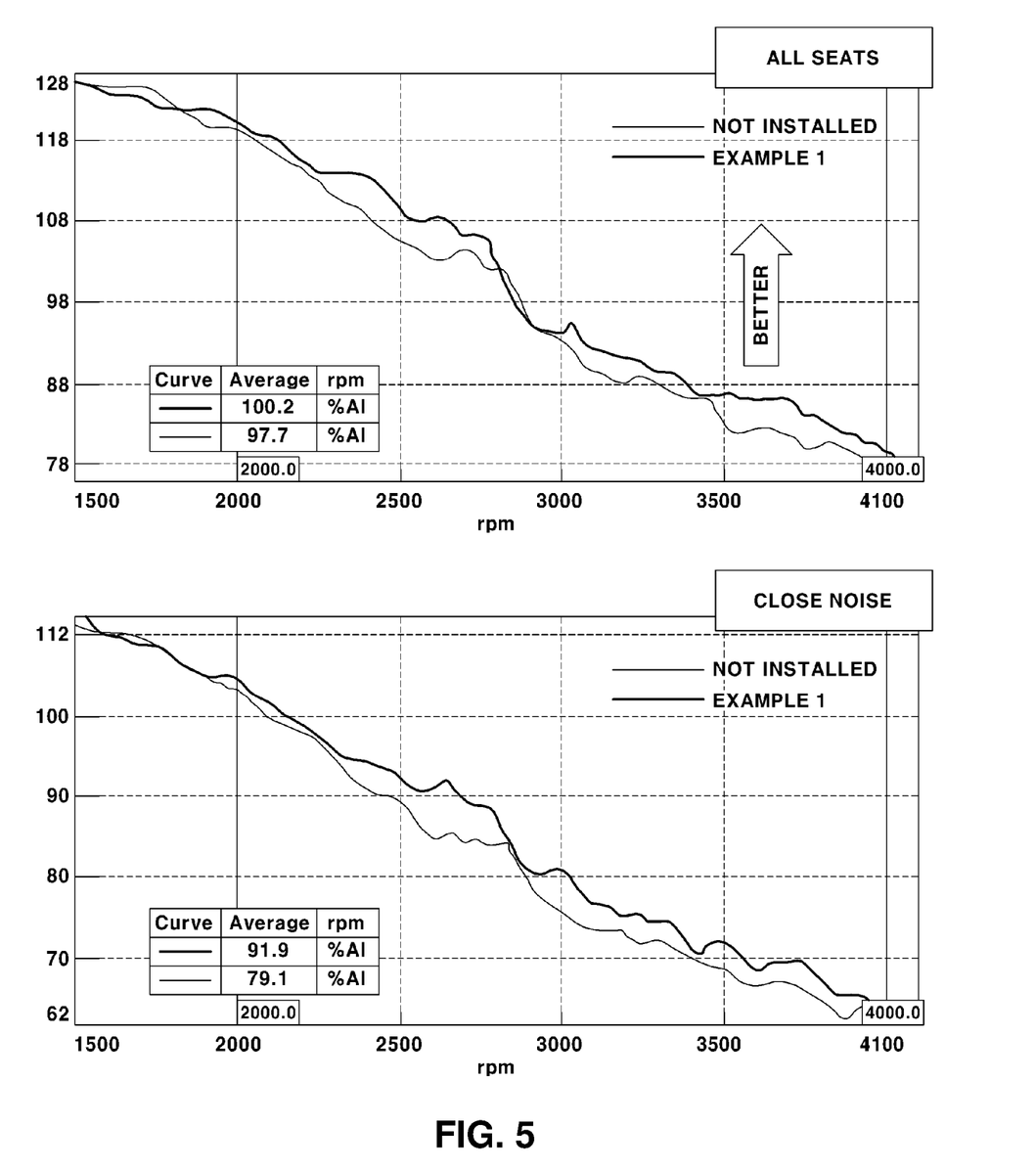
FIG. 5 is a graph showing a result of measuring $3^{rd}$ stage W.O.T acceleration transmission noises of an oil pan cover prepared in Example 1.

In order to measure the level of noises when accelerating, $3^{rd}$ stage W.O.T (@ DYNAMO) acceleration transmission noises were measured. The results are as shown in Table 1 and FIG. 5.

TABLE 1

| Category | Product Weight [g] | 3rd Stage W.O.T 2,000 to 4,000 RPM Al (%) Average | |
|---|---|---|---|
| | | All Seats | Close Noise |
| Not Installed | 0 | 97.7 | 79.1 |
| Example 1 | 182 | 100.2 | 81.9 |

As the measured value increases, acceleration noises decrease. When referring to an average value of the acceleration noises in the RPM areas measured in Table 1, it was seen that the acceleration noises were improved by 2.5 to 2.8% when the oil pan cover of Example 1 was installed. When referring to FIG. 5, it was seen that, in most areas of the measured RPM areas, the acceleration noises decreased when the oil pan cover of Example 1 was installed.

Figure 6:
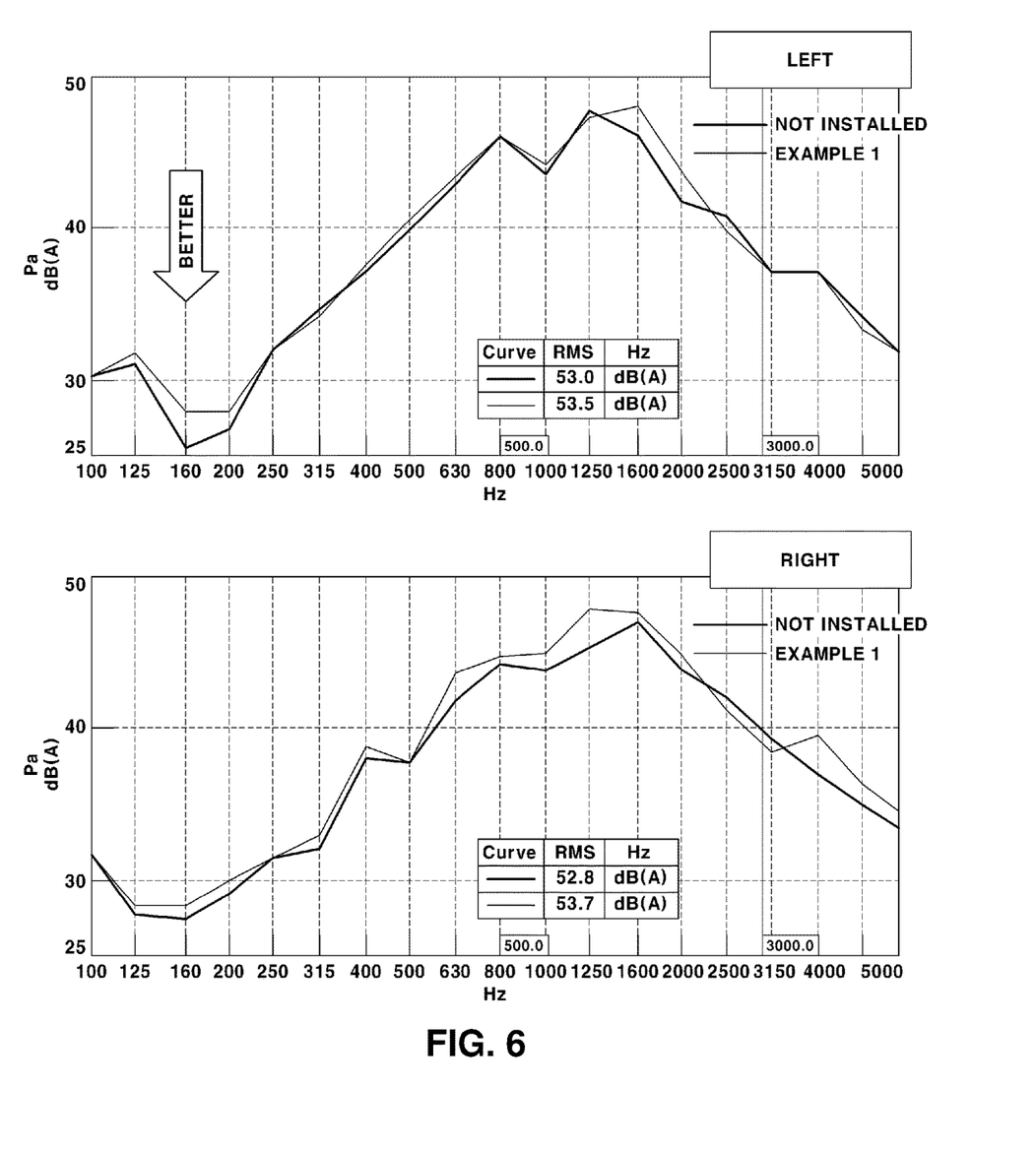
FIG. 6 is a graph showing a result of measuring IDLE N stage pass by noises of an oil pan cover prepared in Example 1.

In order to measure the degree of pass by noises while driving, IDLE N stage pass by noises were measured. The results are as shown in Table 2 and FIG. 6.

TABLE 2

| Category | Product Weight [g] | IDLE N Stage 800 to 3,000 Hz dB (A) RMS (Effective Value) | |
|---|---|---|---|
| | | Right | Left |
| Not Installed | 0 | 53.5 | 53.7 |
| Example 1 | 182 | 53.0 | 52.8 |

As the measured value decreases, the pass by noises decreases. When referring to the effective value (RMS) of the pass by noises in the measured Hz region of Table 2, it was seen that the pass by noises decreased by 0.5 to 0.9 dB (A) when the oil pan cover of Example 1 was installed. When referring to FIG. 6, it was seen that, in most areas of the measured Hz areas, pass by noises decreased when the oil pan cover of Example 1 was installed.

<Test Example 2>—Measurement on Sound Absorbing Efficiency of Component Including PU Layer (1) Example 2

(S10) A web was formed by mixing a polyethylene terephthalate fiber (reinforcing fiber) having a diameter of 39 µm in 50% by weight and a low melting temperature polyethylene terephthalate fiber (binder fiber) in 50% by weight using a card layer method. A skin layer having a surface density of 1400 g/m² was prepared after laminating the web and binding the result using a needle punching method.

The skin layer was inserted into a flat metallic mold of 200° C. and preheated for 60 seconds with 100 kgf/cm². The preheated skin layer was inserted into an oil pan cover-molded metallic mold, and then molded to an oil pan cover shape by pressing the skin layer for 50 seconds with a pressure of 80 kgf/cm². The surface temperature of the oil pan cover-molded metallic mold was adjusted to be 30° C. or lower.

(S30) A polyurethane film having a thickness of 30 µm was attached to upper and lower surfaces of a polyurethane-foamed metallic mold. A crude polyurethane solution formed with 70 parts by weight of polyol, 27 parts by weight of isocyanate and 3 parts by weight of a catalyst was discharged between the films. After closing the upper surface of the metallic mold to touch the lower surface of the metallic mold, the result was foamed for 2 minutes and 30 seconds, and PU foam of 150 kg/m³ surrounded by the polyurethane film was prepared. Scrabs were removed using a trimming metallic mold cutting method, and a sound absorbing pad layer was prepared.

(S50) Chloroprene rubber was coated on an inner side of the skin layer. The sound absorbing pad layer was attached on the adhesive-coated surface to complete an oil pan cover.

(2) Evaluation on Sound Absorbing Efficiency

The degree of quietness improvement of a vehicle when the oil pan cover of Example 2 was installed on a passenger diesel vehicle was evaluated.

Figure 7:
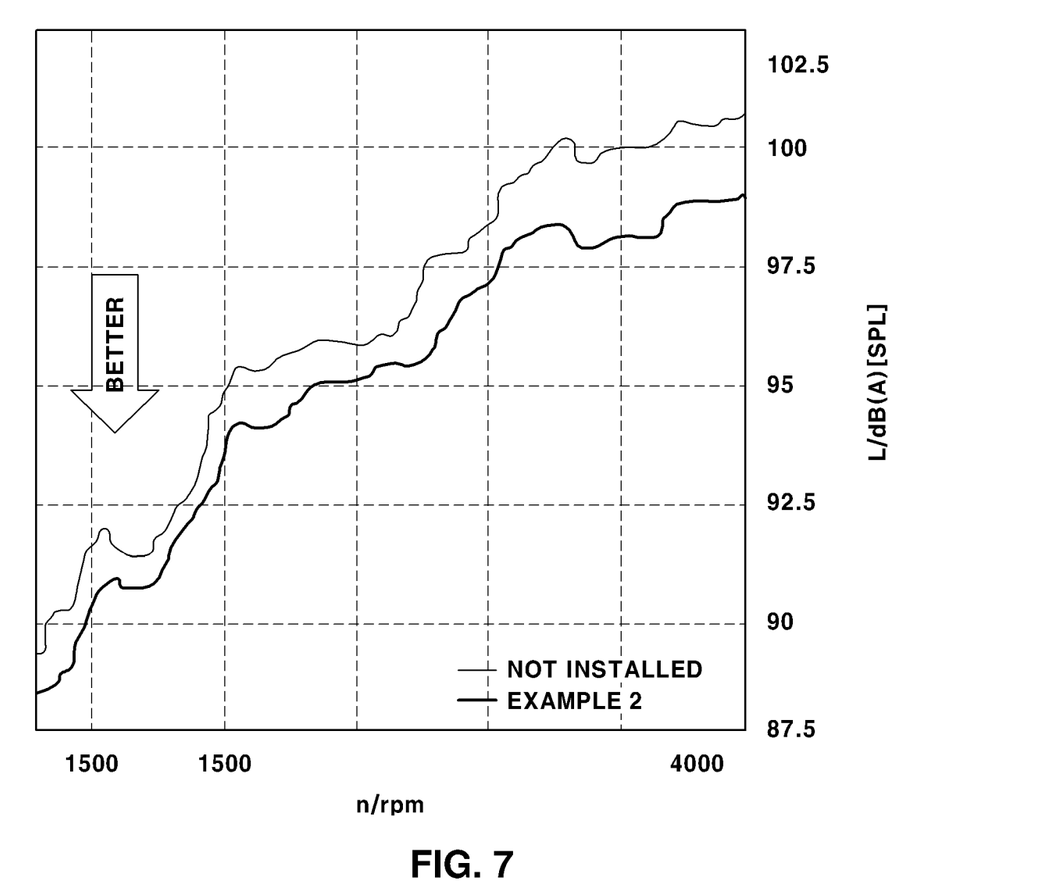
FIG. 7 is a graph showing a result of measuring full load acceleration lower part noises of an oil pan cover prepared in Example 2.

In order to measure the level of lower part noises when accelerating, full load acceleration lower part noises were measured. The results are as shown in Table 3 and FIG. 7.

TABLE 3

| Category | Product Weight [g] | Full Load Acceleration Lower Part Noises 2,000 to 4,000 RPM, dB (A) |
|---|---|---|
| Not Installed | 0 | 97.8 |
| Example 2 | 205 | 96.1 |

Referring to Table 3, it was seen that full load acceleration lower part noises decreased by 1.7 dB (A) when the oil pan cover of Example 2 was installed. When referring to FIG. 7, it was seen that lower part noises while accelerating decreased in the whole region of the measured RPM region when the oil pan cover of Example 2 was installed.

Figure 8:
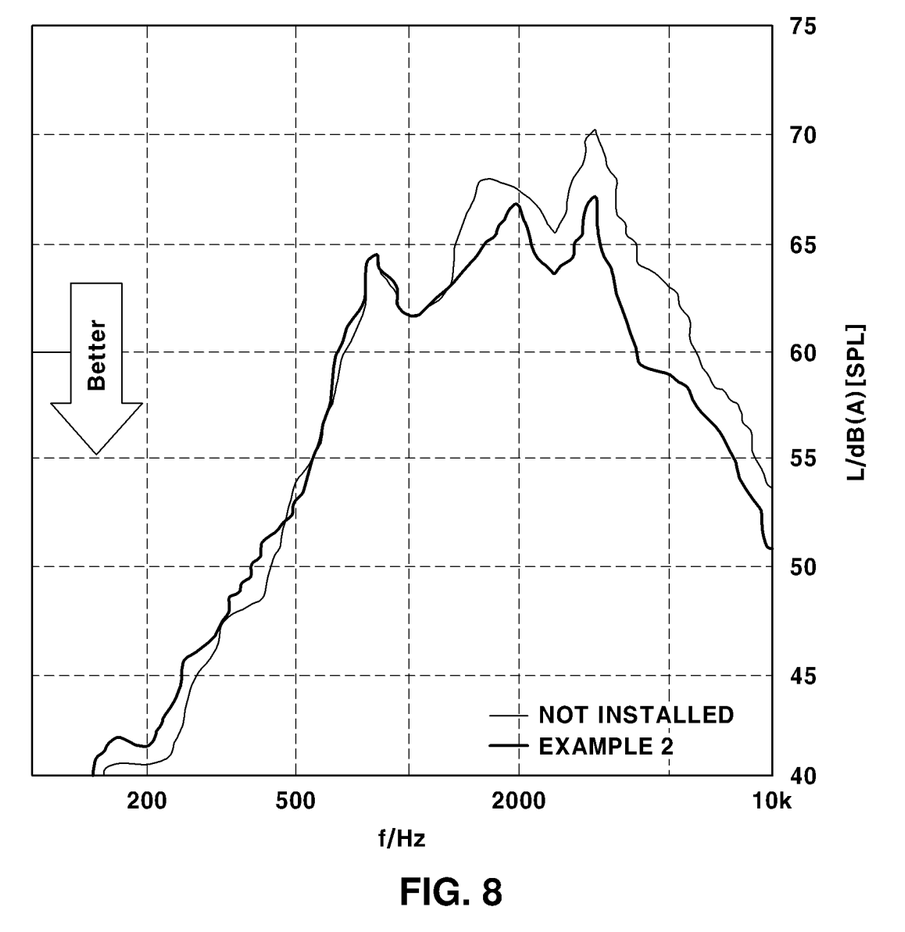
FIG. 8 is a graph showing a result of measuring IDLE N stage lower part noises of an oil pan cover prepared in Example 2.

In order to measure the level of pass by noises while driving, IDLE N stage lower part noises were measured. The results are as shown in Table 4 and FIG. 8.

TABLE 4

| Category | Product Weight [g] | IDLE N Stage Lower Part Noises 1,000 to 4,000 Hz, dB(A) |
|---|---|---|
| Not Installed | 0 | 76.5 |
| Example 2 | 205 | 74.1 |

Referring to Table 4, it was seen that pass by lower part noises decreased by 2.4 dB(A) when the oil pan cover of Example 2 was installed. When referring to FIG. 8, it was seen that pass by lower part noises decreased in most regions of the measured Hz region when the oil pan cover of Example 2 was installed.

<Test Example 3>—Evaluation on Durability of Skin Layer Depending on Diameter of Reinforcing Fiber (1) Example 3

A skin layer was prepared in the same manner as in Example 2, except that a polyethylene terephthalate fiber (reinforcing fiber) having a diameter of 39 μm was used in 70% by weight and a low melting temperature polyethylene terephthalate fiber (binder fiber) was used in 30% by weight.

(2) Comparative Example 2

A skin layer was prepared in the same manner as in Example 2, except that a polyethylene terephthalate fiber (reinforcing fiber) having a diameter of 25 μm was used in 70% by weight and a low melting temperature polyethylene terephthalate fiber (binder fiber) was used in 30% by weight.

(3) Evaluation on Durability

Durability of the skin layer prepared in Example 3 and Comparative Example 2 was measured. A Taber type abrasion tester was used. 1,000 times of rotation were carried out using an abrasion wheel of H-18, and a load was given using a 1 kg weight on both sides of the abrasion tester.

TABLE 5

| Category | Example 3 | Comparative Example 2 |
|---|---|---|
| Weight Prior to Abrasion Test [g] | 20.74 | 20.46 |
| Weight after Abrasion Test [g] | 20.32 | 18.98 |
| Amount of Fiber Loss after Abrasion Test [g] | 0.41 | 1.48 |

When referring to Table 5, it was seen that the amount of fiber loss was small in the skin layer prepared in Example 3, and the skin layer was less worn out even to the naked eye. It was identified that, when the diameter of the reinforcing fiber was less than 30 μm, durability of the skin layer became worse.

<Test Example 4>—Evaluation on Sound Absorbing Efficiency of Component by Skin Layer (1) Example 4

An engine under cover was manufactured using the same method and the materials of Example 1.

(2) Comparative Example 3

A glass fiber-reinforced plastic product of 2140 g/m² was preheated for 180 seconds in an oven maintaining an ambient temperature of 200±10° C. A skin layer was prepared by cold press molding for 50 seconds with a pressure of 150 kgf/cm² using an engine under cover-molded metallic mold of which surface temperature was maintained at 30° C. or lower.

An engine under cover was manufactured in the same manner as in Example 1 except the above.

(3) Evaluation on Sound Absorbing Efficiency

A sound absorption coefficient of the engine under cover prepared in Example 4 and Comparative Example 3 was measured. An alpha cabin was used for the sound absorption coefficient evaluation test.

TABLE 6

| | | Frequency (Hz) | | | |
|---|---|---|---|---|---|
| | | 1,000 | 2,000 | 3,150 | 5,000 |
| Sound Absorption Coefficient | Example 4 | 0.56 | 0.62 | 0.67 | 0.71 |
| | Comparative Example 3 | 0.13 | 0.19 | 0.12 | 0.11 |

When referring to Table 6, it was seen that the sound absorbing coefficient of the engine under cover of Example 4 was measured to be higher by 3 to 5 times than the engine undercover of Comparative Example 3. Accordingly, the component according to the present inventive concept has significantly improved sound absorbing efficiency compared to existing products.

A fibrous component for a vehicle exterior according to the present inventive concept has a skin layer formed in a multilayer structure and thereby has favorable durability, therefore, vehicles can be protected from gravels, water, contaminants and the like.

In addition, a fibrous component for a vehicle exterior according to the present inventive concept has excellent sound absorbing efficiency due to the pores of a skin layer and a sound absorbing pad layer, therefore, quietness of vehicles can be enhanced.

Furthermore, the present inventive concept uses light materials such as fibers and polyurethane foam. Therefore, a lightened fibrous component for a vehicle exterior may be manufactured, and consequently, vehicle fuel efficiency can be improved.

The inventive concept has been described in detail with reference to multiple embodiments thereof. However, it will be appreciated by those skilled in the art that changes may be made in these embodiments without departing from the principles and spirit of the inventive concept, the scope of which is defined in the appended claims and their equivalents.

What is claimed is:

1. A method for manufacturing a fibrous component for a vehicle exterior comprising steps of:
   preparing a skin layer having a multilayer structure comprising a laminated web for skin layer including a reinforcing fiber and a binder fiber, the skin layer including pores that absorb sound;
   preparing a sound absorbing pad layer located on an inner side of the skin layer and absorbing sound; and
   adhering the skin layer and the sound absorbing pad layer,
   wherein the step of preparing the skin layer includes forming the web for skin layer by mixing the reinforcing fiber and the binder fiber, laminating the web for skin layer in a multilayer structure, and then binding the laminated web for skin layer, the reinforcing fiber has a diameter of 30 to 60 and the skin layer is 30 to 70% by weight reinforcing fiber and 30 to 70% by weight binder fiber, based on a total weight of the skin layer,
   wherein the step of preparing the skin layer further includes, after the preparing of the web for skin layer, preheating the web for skin layer by pressing the web for skin layer for 40 to 100 seconds at 150 to 230° C. with a pressure of 60 to 200 kgf/cm$^2$, and
   wherein the step of preparing the skin layer further includes, after the preheating of the web for skin layer, molding the web for skin layer by pressing the web for skin layer for 30 to 70 seconds at a temperature of greater than 0° C. and less than or equal to 40° C. with a pressure of 60 to 200 kgf/cm$^2$ to make the web for skin layer into a shape of the component.

2. The method for manufacturing a fibrous component for a vehicle exterior of claim 1, wherein the step of preparing the skin layer further includes, after the molding of the web for skin layer, trimming the web for skin layer using a method of, water jet cutting, or laser cutting.

3. The method for manufacturing a fibrous component for a vehicle exterior of claim 1, wherein the step of preparing the sound absorbing pad layer includes installing a film having a thickness of 20 to 50 μm into upper and lower parts of a metallic mold in which temperature is adjusted from 40 to 80° C.

4. The method for manufacturing a fibrous component for a vehicle exterior of claim 3, wherein the step of preparing the sound absorbing pad layer further includes, after the installing of the film, injecting a crude polyurethane (PU) solution into the metallic mold, and the crude PU solution includes polyol in 50 to 80% by weight, Isocyanate in 15 to 45% by weight and a catalyst in 1 to 10% by weight, based on a total weight of the crude PU solution.

5. The method for manufacturing a fibrous component for a vehicle exterior of claim 4, wherein the step of preparing the sound absorbing pad layer further includes, after the injecting of the crude PU solution, foaming the crude polyurethane solution for 1 to 3 minutes after closing the metallic mold to prepare PU foam surrounded by the film.

6. The method for manufacturing a fibrous component for a vehicle exterior of claim 5, wherein the step of preparing the sound absorbing pad layer further includes, after the foaming, trimming the polyurethane foam using a method of, water jet cutting, or laser cutting.

7. The method for manufacturing a fibrous component for a vehicle exterior of claim 1, wherein the step of preparing the sound absorbing pad layer includes forming a web for absorbing pad by mixing a sound absorbing fiber having a diameter of 10 to 30 μm at 60 to 80% by weight and an adhesive fiber at 20 to 40% by weight, based on a total weight of the sound absorbing pad layer, then laminating the web for absorbing pad and binding the laminated web for absorbing pad.

8. The method for manufacturing a fibrous component for a vehicle exterior of claim 7, wherein the step of preparing the sound absorbing pad layer further includes, after the preparing of the sound absorbing pad layer, preheating the sound absorbing pad layer for 40 to 100 seconds at 150 to 230° C.

9. The method for manufacturing a fibrous component for a vehicle exterior of claim 8, wherein the step of preparing the sound absorbing pad layer further includes, after the preheating of the sound absorbing pad layer, molding the sound absorbing pad layer by pressing the sound absorbing pad layer for 30 to 70 seconds at a temperature of greater than 0° C. and less than or equal to 40° C. with a pressure of 60 to 200 kgf/cm$^2$ to make the sound absorbing pad layer into the shape of the component.

10. The method for manufacturing a fibrous component for a vehicle exterior of claim 9, wherein the step of preparing the sound absorbing pad layer further includes trimming the sound absorbing pad layer using a method of water jet cutting or laser cutting.

11. The method for manufacturing a fibrous component for a vehicle exterior of claim 1, wherein the reinforcing fiber comprises one or more fibers selected from the group consisting of polyethylene terephthalate (PET), polytrimethylene terephthalate (PTT), polyamide and polyphenylene sulfide (PPS).

12. The method for manufacturing a fibrous component for a vehicle exterior of claim 1, wherein a diameter of the reinforcing fiber is 30 μm to 60 μm.

13. The method for manufacturing a fibrous component for a vehicle exterior of claim 1, wherein the binder fiber comprises one or more fibers selected from the group consisting of low melting temperature polyethylene terephthalate, polypropylene and polyethylene.

14. The method for manufacturing a fibrous component for a vehicle exterior of claim 7, wherein the sound absorbing fiber comprises one or more fibers selected from the group consisting of polyethylene terephthalate (PET), polytrimethylene terephthalate (PTT), polyamide and polyphenylene sulfide (PPS).

15. The method for manufacturing a fibrous component for a vehicle exterior of claim 7, wherein the adhesive fiber comprises one or more fibers selected from the group consisting of low melting temperature polyethylene terephthalate, polypropylene and polyethylene.

* * * * *